(12) United States Patent
Taki

(10) Patent No.: US 11,407,887 B2
(45) Date of Patent: Aug. 9, 2022

(54) RESIN COMPOSITION, SHEATH CABLE, AND WIRE HARNESS

(71) Applicant: Yazaki Corporation, Tokyo (JP)

(72) Inventor: Akihiro Taki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 398 days.

(21) Appl. No.: 16/822,558

(22) Filed: Mar. 18, 2020

(65) Prior Publication Data

US 2020/0299493 A1 Sep. 24, 2020

(30) Foreign Application Priority Data

Mar. 20, 2019 (JP) ............................. JP2019-052725

(51) Int. Cl.
*H01B 7/18* (2006.01)
*C08L 23/16* (2006.01)
*H01B 7/00* (2006.01)

(52) U.S. Cl.
CPC ............ *C08L 23/16* (2013.01); *H01B 7/0045* (2013.01); *H01B 7/18* (2013.01)

(58) Field of Classification Search
CPC ... H01B 7/02; H01B 7/04; H01B 7/06; H01B 7/08; H01B 7/18; H01B 7/0045; C08L 23/08; C08L 23/16
USPC .......................................... 174/110 R–110 M
See application file for complete search history.

(56) References Cited

U.S. PATENT DOCUMENTS

| | | | |
|---|---|---|---|
| 2008/0053696 A1 | 3/2008 | Nakayama et al. | |
| 2014/0367141 A1 | 12/2014 | Tozawa et al. | |
| 2015/0380127 A1* | 12/2015 | Tanigawa ............... | H01B 7/295 |
| | | | 428/389 |
| 2016/0307669 A1 | 10/2016 | Tozawa et al. | |

FOREIGN PATENT DOCUMENTS

| | | | | |
|---|---|---|---|---|
| JP | 61183335 A | 8/1986 | | |
| JP | 2292346 A | 12/1990 | | |
| JP | 8249925 A | 9/1996 | | |
| JP | 2004-018807 A * | 6/2002 | ............. | C08L 23/08 |
| JP | 2008-084833 A | 4/2008 | | |
| JP | 2011032368 A | 2/2011 | | |
| JP | 2014177510 A | 9/2014 | | |
| JP | 2015153514 A | 8/2015 | | |
| JP | 2016-173991 A | 9/2016 | | |
| WO | 2011/090759 A2 | 7/2011 | | |

OTHER PUBLICATIONS

Masami Okamoto et al., "Structure Development and Phase Inversion in Dynamic Vulcanizaiton of Two-Phase Polymer Blends", Kobunshi Ronbunshu, 1991, pp. 657-662, vol. 48, No. 10.

* cited by examiner

*Primary Examiner* — William H. Mayo, III
(74) *Attorney, Agent, or Firm* — Sughrue Mion, PLLC

(57) ABSTRACT

A resin composition contains a resin component containing a copolymer of olefin and a comonomer having polarity and an ethylene-propylene-diene terpolymer. The resin component is cross-linked and the tensile stress at 19% strain is 2.0 MPa or less. The resin composition has a sea-island structure in which the copolymer of olefin and a comonomer having polarity is the continuous phase, and the ethylene-propylene-diene terpolymer is the dispersed phase.

5 Claims, 5 Drawing Sheets

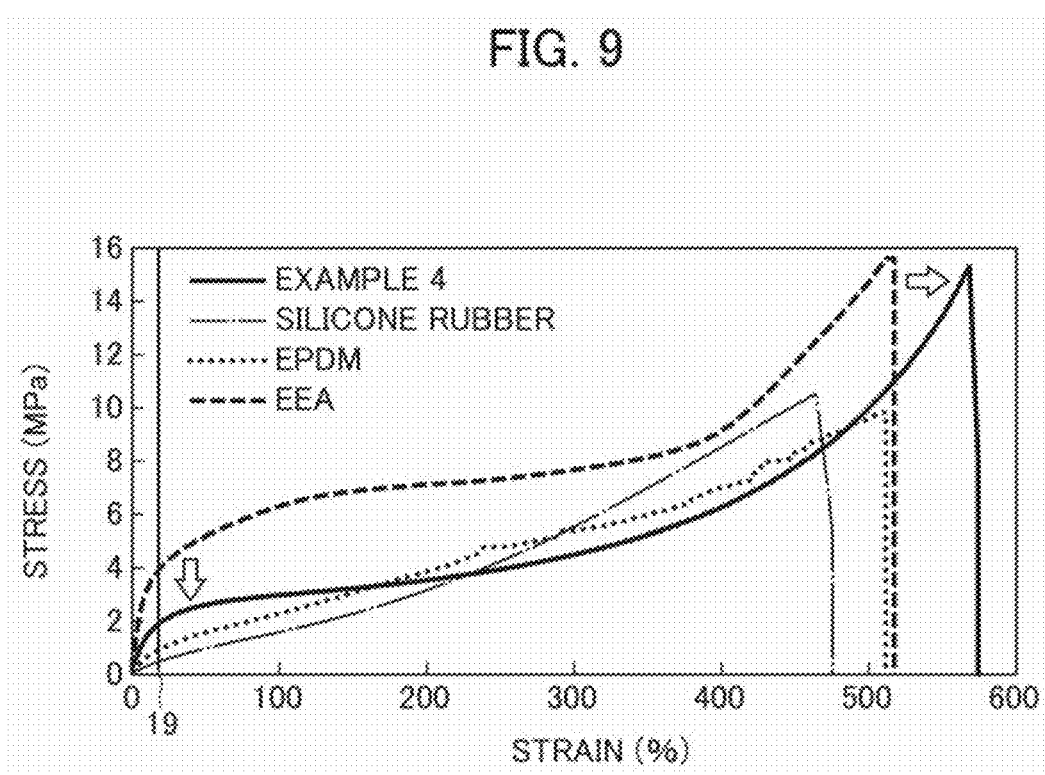

RESIN COMPOSITION, SHEATH CABLE, AND WIRE HARNESS

CROSS-REFERENCE TO RELATED APPLICATIONS

The present application is based on, and claims priority from Japanese Patent Application No. 2019-052725, filed on Mar. 20, 2019, the entire contents of which are incorporated herein by reference.

TECHNICAL FIELD

The disclosure relates to a resin composition, a sheath cable, and a wire harness.

BACKGROUND

In recent years, in order to increase a cruising distance of an electric vehicle, it has been studied to increase a battery capacity. However, it is necessary to increase a conductor diameter of a cable that is a component part of the wire harness so that a charging time does not become longer as the battery capacity increases. On the other hand, since the volume of the battery tends to increase as the battery capacity increases, the ratio of a battery pack to a vehicle body increases. Therefore, it is necessary to design the cable so that it can be bent and routed in a narrow and short path.

In the narrow and short path, a silicone rubber cable in which a conductor is insulated with a flexible silicone rubber is often used. However, the silicone rubber is expensive compared to insulating materials such as polyvinyl chloride, polypropylene, and polyethylene used in the related art. In addition, in a case of manufacturing silicone rubber cables, special equipment is required such as a hot air device for vulcanization after the conductor is sheathed with silicone rubber by extrusion or the like, as compared with a method of manufacturing the insulating materials used in the related art. Furthermore, considering the actual usage environment, there are not so many parts that require a high heat resistance level (200° C.×10,000 hours) like the silicone rubber cable. On the other hand, some cables are disclosed as cables other than the silicone rubber cables.

JP 2008-84833 A discloses a flexible non-halogen cable in which a conductor obtained by twisting a plurality of wires is sheathed with an insulator. The wire has a diameter of 0.12 to 0.31 mm. In the insulator, a resin component material and a metal hydroxide are mixed to form a sheath material, and the sheath material is sheathed on the conductor and then cross-linked to form a cross-linked resin composition. The resin component material is obtained by mixing an ethylene copolymer containing 25% to 40% by weight of a vinyl monomer other than vinyl acetate containing oxygen in a molecular structure as a main component, with an elastomer as a subcomponent.

JP 2016-173991 A discloses an electric cable in which the outer circumference of a conductor composed of a plurality of wires having a wire diameter of 0.15 mm to 0.5 mm is sheathed with an insulating resin containing a flame retardant. The insulating resin is composed of a copolymer A of olefin and a comonomer having polarity, or a mixture of the copolymer A and a copolymer B of olefin and α-olefin. The electric cable diameter/conductor diameter is 1.15 or more and 1.40 or less, the insulating resin is cross-linked, and a secant modulus thereof is 10 MPa or more and 50 MPa or less.

SUMMARY

The flexibility of the flexible non-halogen wire disclosed in JP 2008-84833 A and the electric cable disclosed in JP 2016-173991 A is not necessarily sufficiently high compared to silicone rubber. Moreover, in addition to reducing a thickness of a sheath layer, it is possible to increase flexibility by reducing a diameter of a wire of the conductor; however, actually, considering the cost, it is not practical to reduce the diameter of the wire. Furthermore, the sheath layer of a cable is required to have not only the flexibility but also abrasion resistance.

The disclosure has been made in view of the problems of such techniques in the related art. An object of the disclosure is to provide a resin composition which has sufficient flexibility and abrasion resistance as a sheath layer of a cable, and a sheath cable and a wire harness using the same.

A resin composition according to a some embodiments contains: a resin component containing a copolymer of olefin and a comonomer having polarity and an ethylene-propylene-diene terpolymer, and the resin component is cross-linked, tensile stress at 19% strain of the resin composition is 2.0 MPa or less, and the resin composition has a sea-island structure in which the copolymer of olefin and the comonomer having polarity is a continuous phase, and the ethylene-propylene-diene terpolymer is a dispersed phase.

A ratio of a volume of the copolymer of olefin and the comonomer having polarity to a volume of the ethylene-propylene-diene terpolymer may be 0.5 or more.

In the resin composition, a product of a tensile stress at break and a tensile strain at break may be 50 MPa or more.

A sheathed cable according to some embodiments includes: a conductor, and a sheath layer that is configured to sheathe the conductor, and includes the resin composition in which a distance of movement of sandpaper by a sandpaper abrasion test defined in ISO6722-1 5.12.4.1 is 330 mm or more.

A wire harness according to some embodiments includes the sheath cable.

According to this disclosure, it is possible to provide a resin composition which has sufficient flexibility and abrasion resistance as a sheath layer of a cable, and a sheath cable and a wire harness using the same.

BRIEF DESCRIPTION OF THE DRAWINGS

FIG. 9 is a graph illustrating stress-strain curves of various materials.

DETAILED DESCRIPTION

Figure 1:
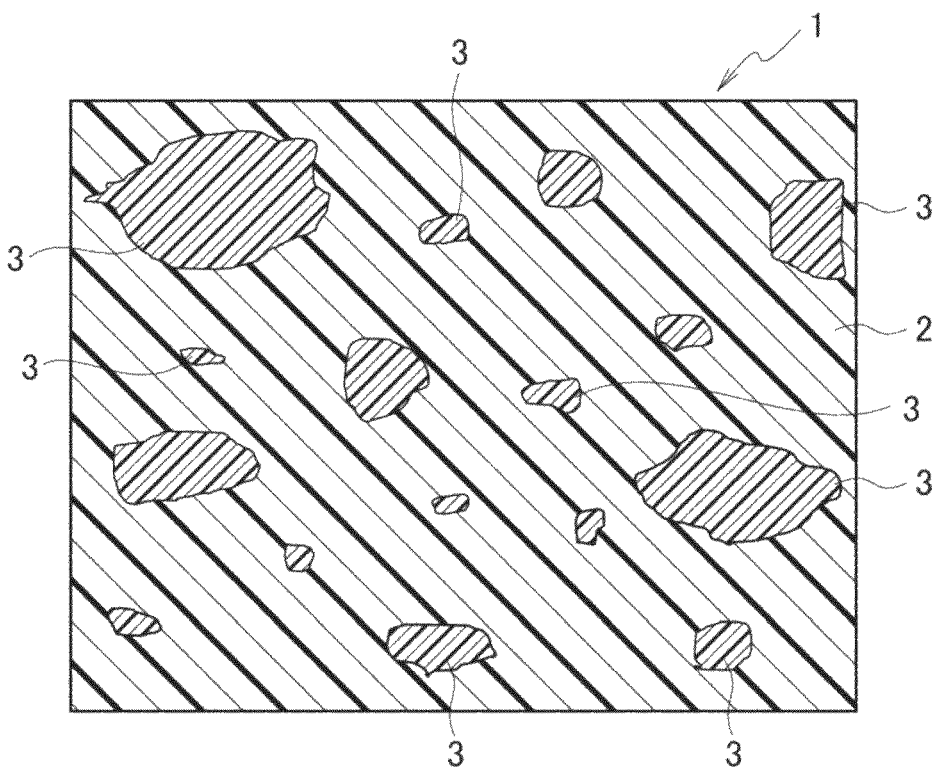
FIG. 1 is a schematic sectional view illustrating an example of a resin composition according to the present embodiment.

Hereinafter, a resin composition, a sheath cable, and a wire harness according to the present embodiment will be described in detail with reference to the drawings. In addition, the dimension ratio of drawing is exaggerated on account of description, and may differ from an actual ratio.

[Resin Composition]

(Resin Component)

A resin composition contains a resin component. The resin component contains a copolymer of olefin and a comonomer having polarity, and an ethylene-propylene-diene terpolymer (EPDM).

The copolymer of olefin and the comonomer having polarity is a copolymer obtained by polymerizing a monomer component containing olefin and a comonomer having polarity. The comonomer having polarity may contain at least one of (meth)acrylate and vinyl acetate. The copolymer of olefin and the comonomer having polarity may be at least one of an ethylene-(meth)acrylate copolymer and an ethylene-vinyl acetate copolymer (EVA). The copolymer of olefin and the comonomer having polarity is preferably an ethylene-(meth)acrylate copolymer in terms of excellent heat resistance. In the present specification, (meth)acrylate means that it is at least one of acrylate and methacrylate.

The ethylene-(meth)acrylate copolymer is a copolymer obtained by polymerizing a monomer component containing ethylene and (meth)acrylate. The ethylene-(meth)acrylate copolymer can form a monomer component containing ethylene and (meth)acrylate by a known polymerization reaction.

The (meth)acrylate contains, for example, at least one (meth)acrylate selected from the group consisting of methyl (meth)acrylate, ethyl (meth)acrylate, butyl (meth)acrylate, and 2-ethylhexyl (meth)acrylate.

Specific examples of the ethylene-(meth)acrylate copolymer are not particularly limited, and include an ethylene-methyl methacrylate copolymer (EMMA), an ethylene-methyl acrylate copolymer (EMA), an ethylene-ethyl acrylate copolymer (EEA), and an ethylene-butyl acrylate copolymer (EBA). These ethylene-(meth)acrylate copolymers may be used alone or two or more thereof may be used in combination. The ethylene-(meth)acrylate copolymer may or may not be modified with maleic acid, maleic anhydride, or the like. Note that, from the viewpoint of the heat resistance, the ethylene-(meth)acrylate copolymers is preferably at least one of the ethylene-methyl acrylate copolymer (EMA), the ethylene-ethyl acrylate copolymer (EEA), and the ethylene-butyl acrylate copolymer (EBA). Further, from the viewpoint of the heat resistance, the ethylene-(meth)acrylate copolymer is more preferably at least one of the ethylene-methyl acrylate copolymer (EMA) and the ethylene-ethyl acrylate copolymer (EEA). From the viewpoint of abrasion resistance, the ethylene-(meth)acrylate copolymer is more preferably the ethylene-ethyl acrylate copolymer (EEA).

The ethylene-(meth)acrylate copolymer may contain a small amount of monomer components other than ethylene and (meth)acrylate. The total content of ethylene and (meth)acrylate contained in the ethylene-(meth)acrylate copolymer is preferably 80% by mass or more, and more preferably 90% by mass or more. Further, the total content of ethylene and (meth)acrylate contained in the ethylene-(meth)acrylate copolymer is still more preferably 95% by mass or more.

The content of (meth)acrylate contained in the ethylene-(meth)acrylate copolymer is not particularly limited, and is preferably 15% by mass or more, more preferably 20% by mass or more, and still more preferably 25% by mass or more. By setting the lower limit of the content of (meth)acrylate to the above value, the flexibility is exhibited even if the additional amount of the ethylene-propylene-diene terpolymer is suppressed, and it is possible to suppress the addition of additives for satisfying the intended heat resistance. With this, the additional amount of the ethylene-propylene-diene terpolymer can be suppressed, and as a result, the formability of the sheath cable can be improved.

The content of ethylene contained in the ethylene-(meth)acrylate copolymer is not particularly limited, and is preferably 55% by mass or more and 75% by mass or less, and more preferably 65% by mass or more and 72% by mass or less. By setting the content of ethylene contained in the ethylene-(meth)acrylate copolymer within the above range, the mechanical properties of the sheath cable described later can be improved.

The ethylene-propylene-diene terpolymer (EPDM) is a rubbery copolymer of ethylene, propylene, and diene. The physical properties of the ethylene-propylene-diene terpolymer are mainly controlled by the amount of ethylene and the amount of diene. The smaller the amount of ethylene, the lower the hardness (softer), and the larger the amount of diene, the smaller the compression set. However, the content of ethylene contained in the ethylene-propylene-diene terpolymer is not particularly limited, and is preferably 70% by mass or less from the viewpoint of improving the flexibility. In addition, the content of diene contained in the ethylene-propylene-diene terpolymer is preferably 7% by mass or less from the viewpoint of improving the heat resistance. The content of diene of 7% by mass or less as described above is also referred to as the amount of medium diene.

The ethylene-propylene-diene terpolymer may contain oils such as mineral oil, paraffin oil, and naphthenic oil. The Mooney viscosity of the ethylene-propylene-diene terpolymer is preferably 60 ML (1+4) 125° C. or less. Note that, 60 ML (1+4) 125° C. means that 60 M is Mooney viscosity, L is a L-shaped rotor shape, and (1+4) is preheating time for 1 minute and rotor rotation for 4 minutes, and 125° C. is a test temperature of 125° C. The Mooney viscosity can be measured according to JIS K6300-1: 2013 (Rubber, unvulcanized-physical property-Part 1: Determination of Mooney viscosity and pre-vulcanization characteristics with Mooney viscometer).

The resin component may contain a resin other than a copolymer of olefin and the comonomer having polarity and an ethylene-propylene-diene terpolymer. The resin component may contain, for example, polyolefin. Polyolefin is a polymer of monomers containing olefins. The polyolefin may be, for example, a copolymer of α olefin and olefin other than the α olefin. The α-olefin may be at least one monomer selected from the group consisting of ethylene, propylene, 1-butene, 1-pentene, 1-hexene, 4-methyl-1-pentene, 1-octene, 1-decene, and the like. The polyolefin may be at least one selected from the group consisting of high density polyethylene (HDPE), low density polyethylene (LDPE), linear low density polyethylene (LLDPE), polypropylene (PP), and an ethylene-propylene block copolymer (EPBC).

In the present embodiment, the resin component is cross-linked. By cross-linking the copolymer of olefin and the comonomer having polarity and an ethylene-propylene-diene terpolymer, the heat resistance of the resin composition can be improved. The method of cross-linking the resin component is not particularly limited. For example, the resin component may be cross-linked by irradiating radiation, or the resin component may be cross-linked with a cross-linking agent contained in the resin composition. In addition, it is preferable that the resin component is radiation-cross-linked.

The radiation used for cross-linking may be, for example, γ rays or electron beams. By irradiating the sheath layer with radiation, radicals are generated in the molecules, and cross-linking bonds between the molecules are formed.

For example, an organic peroxide can be used as the cross-linking agent. As the cross-linking agent, at least one selected from the group consisting of dicumyl peroxide, di-tert-butyl peroxide, 2,5-dimethyl-2,5-di-(tert-butylperoxy) hexane, 2,5-dimethyl-2,5-di-(tert-butylperoxy) hexyne-3, 1,3-bis(tert-butylperoxyisopropyl) benzene, 1,1-bis(tert-butylperoxy)-3,3,5-trimethylcyclohexane, n-butyl-4,4-bis(tert-butylperoxy) valerate, benzoyl peroxide, 2,4-dichlorobenzoyl peroxide, tert-butylperoxybenzoate, tert-butylperoxyisopropyl carbonate, diacetyl peroxide, lauroyl peroxide, and tert-butylcumyl peroxide may be used. The cross-linking agent may be used alone, or a plurality of types thereof may be mixed to be used. In the resin composition, the content of the cross-linking agent is preferably 0.05 to 0.10 parts by mass with respect to 100 parts by mass of the resin component.

In order to improve the cross-linking efficiency, the resin composition may contain a cross-linking aid in addition to the cross-linking agent. A polyfunctional compound can be used as the cross-linking aid. The cross-linking aid may be, for example, at least one compound selected from the group consisting of an acrylate compound, a methacrylate compound, an allyl compound, a vinyl compound, and the like.

The acrylate compound is a polyfunctional compound having an acrylic group at a terminal. Examples of the acrylate compound include 1,1-methanediol diacrylate, 1,2-ethanediol diacrylate, 1,3-propanediol diacrylate, 1,4-butanediol diacrylate, 1,6-hexanediol diacrylate, 1,9-nonanediol diacrylate, 1,10-decanediol diacrylate, vinyl acrylate, allyl acrylate, glyceryl triacrylate, and trimethylolpropane triacrylate.

The methacrylate compound is a polyfunctional compound having a methacryl group at the terminal. Examples of the methacrylate compound include 1,1-methanediol dimethacrylate, 1,2-ethanediol dimethacrylate, 1,3-propanediol dimethacrylate, 1,4-butanediol dimethacrylate, and 1,6-hexanediol dimethacrylate, 1,9-nonanediol dimethacrylate, 1,10-decandiol dimethacrylate, vinyl methacrylate, allyl methacrylate, glyceryl trimethacrylate, and trimethylolpropane trimethacrylate.

The allyl compound is a polyfunctional compound having an allyl group at the terminal. Examples of the allyl compound include diallyl maleate, diallyl itaconate, diallyl malonate, diallyl phthalate, diallyl benzene phosphate, triallyl phosphate, and triallyl cyanurate.

The vinyl compound is a polyfunctional compound having a vinyl group at the terminal. Examples of the vinyl compound include divinylbenzene and ethylene glycol divinyl ether.

These polyfunctional compounds may be used alone or two or more thereof may be used in combination. Among these compounds, trimethylolpropene trimethacrylate is preferably used in terms of high affinity with the resin component.

The content of the cross-linking aid in the resin composition is preferably 0.1 to 5 parts by mass and more preferably 0.8 to 2 parts by mass with respect to 100 parts by mass of the resin component. Within such a range, the heat resistance, workability, and bleed resistance of the resin composition can be further improved.

The resin composition has a sea-island structure. The sea-island structure is generally a structure in which specific components are dispersed in an island shape in matrix sea. As illustrated in FIG. 1, a sea-island structure 1 generally has a phase separation structure having a continuous phase 2 (sea structure) as a matrix and a dispersed phase 3 (island structure) dispersed in the continuous phase 2. In the sea-island structure 1, the cross section of the resin composition can be observed with a scanning electron microscope (SEM), a transmission electron microscope (TEM), or the like.

In the sea-island structure 1, a copolymer of olefin and the comonomer having polarity is the continuous phase 2 (sea structure), and an ethylene-propylene-diene terpolymer is the dispersed phase 3 (island structure). Both the copolymer of olefin and the comonomer having polarity and the ethylene-propylene-diene terpolymer contain an olefin monomer. Accordingly, the ethylene-propylene-diene terpolymer can be uniformly dispersed as the dispersed phase 3 without using a compatibilizing agent that improves the compatibility between different polymers, or without modifying the resin component with maleic anhydride or the like.

In the cross section of the resin composition, an average value of an area of the dispersed phase 3 is preferably 5 μm² or less, more preferably 3 μm² or less, and still more preferably 1 μm² or less. Within such a range, the abrasion resistance of the resin composition can be further improved. The average value of the area of the dispersed phase 3 can be obtained by measuring the area of each dispersed phase 3 using image analysis/measurement software in a sectional photograph observed with a transmission electron microscope or the like, and calculating the average value of each area.

The resin composition may have a structure different from the sea-island structure, such as a co-continuous structure. In the resin component, the proportion having a sea-island structure is preferably 80% or more, more preferably 90% or more, and still more preferably 95% or more. Within such a range, the abrasion resistance of the resin composition can be further improved.

In general, in a case where different types of resins having different apparent viscosities are melted and kneaded at a predetermined ratio, if the α value defined by $\alpha=(\eta_1/\eta_2)(\varphi_2/\varphi_1)$ is approximately 1, both phases are continuous. If the α value exceeds 1, it is known that one resin forms a dispersed phase. Refer to "Structure Development and Phase Inversion in Dynamic Vulcanization of Two-Phase Polymer Blends", written by Masami Okamoto et al., Kobunshi Ronbunshu, October 1991, Vol. 48, No. 10, pp. 657-662.

Accordingly, the resin component preferably has an α value of more than 1 derived from the formula $\alpha=(\eta_1/\eta_2)(\varphi_2/\varphi_1)$. When the α value exceeds 1, it is easy to form a sea-island structure in which the copolymer of olefin and the comonomer having polarity is the continuous phase 2, and the ethylene-propylene-diene terpolymer is the dispersed phase 3. That is, in order to form the sea-island structure, not only the volume fraction of the copolymer of olefin and the comonomer having polarity and the ethylene-propylene-diene terpolymer, but also the apparent viscosity at the time of melt-kneading is important.

In the above formula, $\eta_1$ represents the apparent viscosity (Pa·s) at the time of melt-kneading the ethylene-propylene-diene terpolymer. $\eta_2$ represents an apparent viscosity (Pa·s) at the time of melt-kneading the copolymer of olefin and the comonomer having polarity. In the present specification, the apparent viscosity is measured in accordance with the provisions of JIS K7199: 1999 (plastics-Determination of the fluidity of plastics using capillary and slit-die rheometers).

In the above formula, $\varphi_1$ represents the volume fraction (%) of ethylene-propylene-diene terpolymer with respect to the total of the copolymer of olefin and the comonomer having polarity and the ethylene-propylene-diene terpolymer. $\varphi_2$ represents the volume fraction (%) of the copolymer of olefin and the comonomer having polarity with respect to the total of the copolymer of olefin and the comonomer having polarity and the ethylene-propylene-diene terpolymer.

The ratio ($\eta_1/\eta_2$) of apparent viscosity ($\eta_1$) during melt-kneading of the ethylene-propylene-diene terpolymer to apparent viscosity ($\eta_2$) during melt-kneading of the copolymer of olefin and the comonomer having polarity is preferably 0.6 or more. By setting in this way, the selection range of the volume fraction of the copolymer of olefin and the comonomer having polarity and the ethylene-propylene-diene terpolymer is widened, and the degree of freedom in designing the resin composition can be improved. Note that, the ratio ($\eta_1/\eta_2$) of apparent viscosity ($\eta_1$) during the melt-kneading of the ethylene-propylene-diene terpolymer to apparent viscosity ($\eta_2$) during the melt-kneading of the copolymer of olefin and the comonomer having polarity is more preferably 1 or more. The ratio ($\eta_1/\eta_2$) of apparent viscosity ($\eta_1$) during melt-kneading of the ethylene-propylene-diene terpolymer to apparent viscosity ($\eta_2$) during melt-kneading of the copolymer of olefin and the comonomer having polarity is preferably 2 or less. By setting in this way, the workability becomes favorable and the selection range of the melt-kneading conditions becomes wide, so that the resin composition can be easily formed.

The apparent viscosity ($\eta_1$) of the ethylene-propylene-diene terpolymer during the melt-kneading is preferably 50 Pa·s or more, and more preferably 100 Pa·s or more. The apparent viscosity ($\eta_1$) of the ethylene-propylene-diene terpolymer during the melt-kneading is preferably 1,000 Pa·s or less, and more preferably 500 Pa·s or less. By setting the apparent viscosity within the above range, the formability of the resin composition can be improved.

The apparent viscosity ($\eta_2$) of the copolymer of olefin and the comonomer having polarity during the melt-kneading is preferably 50 Pa·s or more, and more preferably 100 Pa·s or more. The apparent viscosity ($\eta_2$) of the copolymer of olefin and the comonomer having polarity during the melt-kneading is preferably 1,000 Pa·s or less, and more preferably 500 Pa·s or less. By setting the apparent viscosity within the above range, the formability of the resin composition can be improved.

The ratio of the volume of the copolymer of olefin and the comonomer having polarity to the volume of the ethylene-propylene-diene terpolymer is preferably 0.5 or more. That is, the ratio ($\varphi_2/\varphi_1$) of the volume fraction ($\varphi_2$) of the copolymer of olefin and the comonomer having polarity to the volume fraction ($\varphi_1$) of the ethylene-propylene-diene terpolymer is preferably 0.5 or more. By setting in this way, the workability can be improved and the selection range of melt-kneading conditions can be widened. In addition, the ratio ($\varphi_2/\varphi_1$) of the volume fraction ($\varphi_2$) of the copolymer of olefin and the comonomer having polarity to the volume fraction ($\varphi_1$) of the ethylene-propylene-diene terpolymer is preferably 10 or less. By setting in this way, the selection range of the volume fraction of the copolymer of olefin and the comonomer having polarity and the ethylene-propylene-diene terpolymer is widened, and the degree of freedom in designing the resin composition can be improved.

The volume fraction ($\varphi_1$) of the ethylene-propylene-diene terpolymer is preferably 15% or more, and more preferably 20% or more. The volume fraction ($\varphi_1$) of the ethylene-propylene-diene terpolymer is preferably 55% or less, and more preferably 50% or less.

The volume fraction ($\varphi_2$) of the copolymer of olefin and the comonomer having polarity is preferably 45% or more, and more preferably 50% or more. The volume fraction ($\varphi_2$) of the copolymer of olefin and the comonomer having polarity is preferably 85% or less, and more preferably 80% or less.

The total content of the copolymer of olefin and the comonomer having polarity and the ethylene-propylene-diene terpolymer in the resin component is preferably 80% by mass or more, more preferably 90% by mass or more, and still more preferably 95% by mass or more. By setting in this way, the sea-island structure of the copolymer of olefin and the comonomer having polarity and the ethylene-propylene-diene terpolymer can be satisfactorily formed.

The content of the ethylene-propylene-diene terpolymer in the resin component is not particularly limited, and is preferably 15% by mass to 55% by mass. By setting the content to 15% by mass or more, the flexibility of the resin composition can be improved. In addition, when the content is 55% by mass or less, the abrasion resistance can be improved. From the viewpoint of the flexibility, the content of the ethylene-propylene-diene terpolymer in the resin component is more preferably 20% by mass or more, more preferably 25% by mass or more, and particularly preferably 30% by mass or more. Further, from the viewpoint of the abrasion resistance, the content of the ethylene-propylene-diene terpolymer in the resin component is more preferably 50% by mass or less, more preferably 45% by mass or less, and particularly preferably 40% by mass or less. Moreover, by setting in this way, when a resin composition is extrusion-molded to produce a sheath cable, a deformation of an extrusion-molded product can be suppressed.

(Flame Retardant)

The resin composition may contain a flame retardant in order to improve flame retardancy. The content of the flame retardant is preferably less than 50 parts by mass when the content of the resin component is 100 parts by mass. By setting the content of the flame retardant to be less than 50 parts by mass, the flexibility of the resin composition can be improved. From the viewpoint of the flexibility, the content of the flame retardant is preferably 45 parts by mass or less when the content of the resin component is 100 parts by mass. From the viewpoint of the flame retardancy, the content of the flame retardant when the content of the resin component is 100 parts by mass is preferably 20 parts by mass or more, more preferably 25 parts by mass or more, and still more preferably 30 parts by mass or more.

The kind of flame retardant is not particularly limited as long as the flame retardancy can be imparted to the resin composition. The flame retardant may contain, for example, at least one of an organic flame retardant and an inorganic flame retardant. The organic flame retardant may contain, for example, at least one or more flame retardants selected from the group consisting of a halogen flame retardant, a phosphorus flame retardant, and a nitrogen flame retardant. The inorganic flame retardant may contain, for example, at least one of a metal hydroxide and an antimony flame retardant. The metal hydroxide may contain at least one of magnesium hydroxide and aluminum hydroxide, for example. The antimony flame retardant may contain, for example, antimony trioxide.

The halogen flame retardant can capture hydroxyl radicals that promote the combustion of a thermoplastic resin and suppress the combustion of the resin composition. The halogen flame retardant may be, for example, a compound in which at least one or more halogens are substituted with an organic compound. The halogen flame retardant may contain, for example, at least one or more flame retardants selected from the group consisting of a fluorine flame retardant, a chlorinated flame retardant, a brominated flame retardant, and an iodinated flame retardant. The halogen flame retardant is preferably a brominated flame retardant or a chlorinated flame retardant, and more preferably a brominated flame retardant.

The chlorinated flame retardant may contain, for example, at least one flame retardant selected from the group consisting of chlorinated polyethylene, chlorinated paraffin, perchlorocyclopentadecane, and the like.

The brominated flame retardant may contain at least one flame retardant selected from the group consisting of, for example, 1,2-bis(bromophenyl) ethane, 1,2-bis(pentabromophenyl) ethane, hexabromobenzene, ethylenebis-dibromo-monorbornane dicarboximide, ethylenebis-tetrabromophthalimide, tetrabromobisphenol S tris(2,3-dibromopropyl-1) isocyanurate, hexabromocyclododecane (HBCD), octabromophenyl ether, tetrabromobisphenol A (TBA), a TBA epoxy oligomer or polymer, TBA-bis(2,3-dibromopropyl ether), decabromodiphenyl oxide, polydibromophenylene oxide, bis(tribromphenoxy) ethane, ethylenebis(pentabromophenyl), dibromoethyl-dibromocyclohexane, dibromoneopentyl glycol, tribromophenol, tribromophenol allyl ether, tetradecabromodiphenoxybenzene, 2,2-bis(4-hydroxy-3,5-dibromophenyl) propane, 2,2-bis(4-hydroxy-ethoxy-3,5-dibromophenyl) propane, pentabromophenol, pentabromotoluene, pentabromodiphenyl oxide, hexabromodiphenyl ether, octabromodiphenyl ether, decabromodiphenyl ether, octabromodiphenyl oxide, dibromoneopentylglycol tetracarbonate, bis(tribromophenyl) fumaramide, and N-methylhexabromophenylamine.

The phosphorus flame retardant may contain, for example, at least one or more flame retardants selected from the group consisting of phosphate ester, condensed phosphate ester, a cyclic phosphorus compound, and red phosphorus.

The nitrogen flame retardant may contain, for example, at least one of a guanyl urea flame retardant such as guanyl urea phosphate and a melamine compound such as melamine cyanurate.

The flame retardant preferably contains a brominated flame retardant and an antimony flame retardant, and more preferably contains ethylene bis(pentabromophenyl) and antimony trioxide. In the resin composition according to the present embodiment, by using the flame retardants as described above, the flame retardancy can be improved even with a small content.

The content of the brominated flame retardant with respect to the whole flame retardants is preferably 50% by mass to 80% by mass, and more preferably 60% by mass to 70% by mass. Further, the content of the antimony flame retardant with respect to the whole flame retardants is preferably 20% by mass to 50% by mass, and more preferably 30% by mass to 40% by mass. Further, the ratio of the brominated flame retardant to the antimony flame retardant (brominated flame retardant/antimony flame retardant) is preferably 1 to 4, and more preferably 3/2 to 7/3.

In the resin composition of the present embodiment, it is preferable that an additive is further contained and the content of the additive is 25 parts by mass or less when the content of the resin component is 100 parts by mass. By setting the content of the additive to 25 parts by mass or less, the flexibility of the resin composition can be improved.

In the resin composition of the present embodiment, when the content of the resin component is 100 parts by mass, the content of the flame retardant and the additive other than the flame retardant is preferably less than 70 parts by mass. By setting the content of the flame retardant and the additives other than the flame retardant to be less than 70 parts by mass, the flexibility of the resin composition can be improved. Note that, in the resin composition of the present embodiment, when the content of the resin component is 100 parts by mass, the content of the flame retardant and the additive other than the flame retardant is more preferably less than 60 parts by mass.

Examples of the additives include the above-mentioned cross-linking agents, the above-mentioned cross-linking aids, antioxidants, processing aids, plasticizers, metal deactivators, fillers, reinforcing agents, UV absorbers, stabilizers, pigments, dyes, coloring agents, antistatic agents, and foaming agents.

Examples of the antioxidant include a phenolic antioxidant, a phosphorus antioxidant, and a sulfur antioxidant.

Examples of the processing aid include petroleum oils such as paraffinic oils and naphthenic oils added to rubber materials and the like.

As described above, high flexibility is required for the resin composition forming the sheath layer of the sheath cable. Here, in consideration of a case where, for example, the radius of the sheath cable and the sheath cable is bent with a predetermined curvature, when a tensile stress at 19% strain of the resin composition is set to a predetermined value or less, the survey has revealed that the sheath cable has sufficient flexibility in practical use. Therefore, in the resin composition of the present embodiment, the tensile stress at 19% strain is 2.0 MPa or less. By setting the tensile stress at 19% strain of the resin composition to 2.0 MPa or less, the flexibility of the resin composition can be improved. Further, in order to bring the flexibility closer to the silicone rubber, the tensile stress at 19% strain is more preferably 1.5 MPa or less. The tensile stress at 19% strain can be measured according to JIS K7161-1: 2014 (Plastics-Determination of tensile properties-Part 1: General principles).

The resin composition of the present embodiment preferably has heat resistance of 150° C. as defined in the Japanese Automotive Standards Organization JASO D624. Since the resin composition has the heat resistance as described above, it can be used as a sheath layer for cables even in a high-temperature environment such as an automobile.

In the resin composition, it is preferable that a distance of movement of sandpaper by the sandpaper abrasion test defined in ISO6722-1 (4th edition) 5.12.4.1 is 330 mm or more. Within such a range, the abrasion resistance of the resin composition can be improved. In addition, although the upper limit of the movement distance of sandpaper is not particularly limited, and for example, it may be 10,000 mm or less.

In the resin composition of the present embodiment, a product of a tensile stress at break and a tensile strain at break is preferably 50 MPa or more. The product of the tensile stress at break and the tensile strain at break has a correlation with the abrasion resistance, and the abrasion resistance can be improved by setting the product to 50 MPa or more. Moreover, the upper limit of the product of the tensile stress at break and the tensile strain at break is not particularly limited, and may be, for example, 1000 MPa or less, or 500 MPa or less. The tensile stress at break and the tensile strain at break can be measured in accordance with JIS K7161-1: 2014.

The resin composition is produced by melt-kneading the above-described resin component, and known methods can be used for the method. For example, the resin composition can be obtained by pre-blending using a high-speed mixing device such as a Henschel mixer and then kneading using a known kneader such as a Banbury mixer, kneader, or roll mill.

As described above, the resin composition contains the resin component containing the copolymer of olefin and the comonomer having polarity and the ethylene-propylene-diene terpolymer. The resin component is cross-linked and the tensile stress at 19% strain is 2.0 MPa or less. The resin composition has a sea-island structure in which the copolymer of olefin and the comonomer having polarity is the continuous phase, and the ethylene-propylene-diene terpolymer is the dispersed phase. Therefore, the resin composition has sufficient flexibility and the abrasion resistance as a sheath layer of the cable.

[Sheath Cable]

Figure 2:
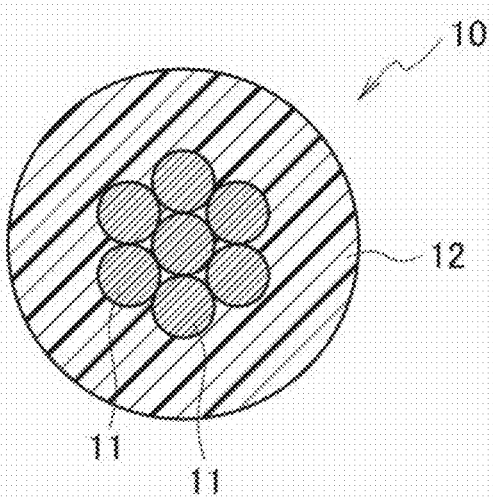
FIG. 2 is a schematic sectional view illustrating an example of a sheath cable according to the present embodiment.

FIG. 2 is a sectional view illustrating an example of a sheath cable 10 according to the present embodiment. As illustrated in FIG. 2, the sheath cable 10 of the present embodiment includes a conductor 11 and a sheath layer 12 that configured to sheathe the conductor 11, and includes the resin composition according to the above embodiment. The resin composition according to the above embodiment is excellent in the flexibility and the abrasion resistance. Therefore, the sheath cable 10 including the sheath layer 12 including such a resin composition can be preferably used as the sheath cable 10 for automobiles, for example.

The conductor 11 may be composed of only one wire, or may be a stranded wire configured by bundling a plurality of wires. The conductor 11 may be composed of only one stranded wire, or may be a composite stranded wire configured by bundling a plurality of the stranded wires. The configuration and size of the conductor 11 are preferably the configuration and size defined in at least one of JASO D624 and ISO 6722-1.

The diameter of the conductor 11 is not particularly limited, and is preferably 4.0 mm or more, and more preferably 5.0 mm or more. By setting the diameter of the conductor 11 as described above, the resistance of the conductor can be reduced, and for example, even for a large capacity battery, the charging time can be shortened. Further, the diameter of the conductor 11 is not particularly limited, and is preferably 25 mm or less, and more preferably 20 mm or less. By setting the diameter of the conductor 11 as described above, the sheath cable 10 can be easily routed even in a narrow and short path.

The diameter of the wire is not particularly limited, but is preferably 0.1 mm or more, and more preferably 0.2 mm or more. By setting the diameter of the wire as described above, cutting of the wire can be suppressed. Further, the diameter of the wire is not particularly limited, and is preferably 0.5 mm or less, and more preferably 0.4 mm or less. By setting the diameter of the wire as described above, the sheath cable 10 can be easily routed even in a narrow and short path.

The material forming the conductor 11 is not particularly limited, and is preferably at least one conductive metal material selected from the group consisting of copper, copper alloys, aluminum, aluminum alloys, and the like.

The thickness of the sheath layer 12 is not particularly limited, and is preferably 0.5 mm or more, and more preferably 0.65 mm or more. By setting the thickness of the sheath layer 12 as described above, the conductor 11 can be effectively protected. Further, the thickness of the sheath layer 12 is not particularly limited, and is preferably 2.0 mm or less, and more preferably 1.85 mm or less. By setting the thickness of the sheath layer 12 as described above, the sheath cable 10 can be easily routed even in a narrow and short path.

The sheath cable 10 may further include a shield layer that sheaths the sheath layer 12 and the sheath layer that further sheaths the shield layer. The shield layer can prevent unnecessary electromagnetic waves from being emitted from the conductor 11. The shield layer can be formed by knitting a conductive metal foil, a metal-containing foil, or a metal wire (metal conductor) in a mesh shape. The sheath layer can effectively protect and bundle the shield layer. Although it does not particularly limit as a sheath layer, an olefin resin, such as polyethylene, may be used and the resin composition according to the embodiment may be used.

As a method for sheathing the conductor 11 with the sheath layer 12, known methods can be used. For example, the sheath layer 12 can be formed by a general extrusion method. As an extruder used by an extrusion method, a single screw extruder or a twin screw extruder is used, for example, and those having a screw, a breaker plate, a crosshead, a distributor, a nipple, and a die can be used.

In a case of producing the resin composition forming the sheath layer 12, the resin composition is put into an extruder set at a temperature at which the resin is sufficiently melted. At this time, if necessary, other components such as a flame retardant, an antioxidant, and a processing aid are also introduced into the extruder. The resin composition is melted and kneaded by a screw, and a certain amount is supplied to a cross head via a breaker plate. The molten resin composition flows onto the circumference of a nipple by a distributor, and is extruded in a state of being sheathed on the outer circumference of the conductor 11 by a die, thereby obtaining a sheath layer 12 that sheaths the outer circumference of the conductor 11.

Thus, in the sheath cable 10 of the present embodiment, the sheath layer 12 can be formed by extrusion molding in the same manner as a general resin composition for cables. In order to improve the strength of the sheath layer 12, after the sheath layer 12 is formed on the outer circumference of the conductor 11, the resin composition may be cross-linked by a method such as the radiation irradiation described above.

[Wire Harness]

The wire harness according to the present embodiment includes the sheath cable 10. The resin composition according to the above embodiment is excellent in the flexibility and the abrasion resistance. Therefore, the sheath cable 10 including the sheath layer 12 including such a resin composition can be preferably used as the wire harness for automobiles, for example.

EXAMPLES

Hereinafter, the present embodiment will be described in more detail with reference to examples and comparative examples, but the present embodiment is not limited to these examples.

As a metal conductor, a pure copper conductor (stranded wire) having a cross-sectional area of 3.0 mm$^2$ was prepared. Then, the conductor was sheathed with a resin composition having a composition (unit: part by mass) indicated in Table 1 to produce a sheath cable. The conductor was sheathed under the temperature condition of about 140° C. to 180° C. using an extrusion sheathing apparatus for cable production which has a screw diameter of 40 mm. The temperature of the melt-kneading of the resin composition and the temperature of the resin immediately after coming out of the extrusion sheathing apparatus were about 140° C. The extrusion sheathing apparatus was adjusted so that the thickness of the sheath layer after sheathing was 0.65 mm as a standard. The sheath cable was cross-linked under the conditions of 750 kV to 950 kV×140 kGCy to 200 kGy.

(Resin Component)

(1) Ethylene-Ethyl Acrylate Copolymer (EEA)

Ethyl acrylate (EA) content 30% by mass

EX4227 manufactured by Ube-Maruzen Polyethylene Co, Ltd.

(2) Ethylene-Propylene-Diene Terpolymer (EPDM)

NORDEL (registered trademark) IP4760P manufactured by The Dow Company (Flame Retardant)

(1) Brominated Flame Retardant

Ethylene bis(pentabromophenyl) 30 parts by mass

SAYTEX (registered trademark) 8010 manufactured by Albemarle Corporation (2) Antimony Flame Retardant Antimony trioxide 10 parts by mass PATOX (registered trademark) M manufactured by Nippon Seiko Co., Ltd.

The brominated flame retardant content was 75% by mass and the antimony flame retardant content was 25% by mass with respect to the entire flame retardant. That is, the ratio of the brominated flame retardant to the antimony flame retardant (brominated flame retardant/antimony flame retardant) was adjusted to 3.

(Antioxidant)

(1) ADK STAB (registered trademark) AO-20 manufactured by ADEKA CORPORATION 2 parts by mass (2) ADK STAB (registered trademark) AO-412S manufactured by ADEKA CORPORATION 2 parts by mass (Processing Aid)

Trimethylolpropane trimethacrylate (TMPT) manufactured by Shin-Nakamura Chemical Co., Ltd.

(Evaluation)

The α value of each example was determined by the following method, and the flexibility and abrasion resistance of each example were evaluated. These results are indicated in Table 1. Further, the cross sections of the sheath layers of Example 1, Example 2, and Example 4 were observed using a transmission electron microscope by the following method. The results are illustrated in FIGS. 3 to 8 Further, the relationship between the tensile stress at break and the tensile strain at break was evaluated for the sheath cable of Example 4. The results are illustrated in FIG. 9.

(α Value)

The α value was derived from the formula $\alpha=(\eta_1/\eta_2)(\varphi_2/\varphi_1)$. In the above formula, $\eta_1$ represents the apparent viscosity (Pa·s) of the ethylene-propylene-diene terpolymer, $\eta_2$ represents the apparent viscosity (Pa·s) of the ethylene-ethyl acrylate copolymer; $\varphi_1$ represents the volume fraction (%) of ethylene-propylene-diene terpolymer with respect to the total of the ethylene-ethyl acrylate copolymer and the ethylene-propylene-diene terpolymer, $\varphi_2$ represents the volume fraction (%) of the ethylene-ethyl acrylate copolymer with respect to the total of the ethylene-ethyl acrylate copolymer and the ethylene-propylene-diene terpolymer. Note that, the volume fraction was calculated assuming that it was substantially the same as the mass ratio.

(Apparent Viscosity)

The apparent viscosity was measured in accordance with JIS K7199: 1999. Specifically, the apparent viscosity was measured under the following conditions.

Apparatus: Capilograph (registered trademark) manufactured by Toyo Seiki Seisaku-sho, Ltd.

Test temperature: 120° C.

Shear rate: 1.2×10$^3$s$^{-1}$ (piston speed 100 mm/min)

Capillary length: 10 mm

Capillary diameter 1 mm

Barrel diameter of furnace body: 9.55 mm

When the apparent viscosity was measured under the above conditions, the apparent viscosity of the ethylene-ethyl acrylate copolymer (EEA) was 322 Pa·s, and the apparent viscosity of the ethylene-propylene-diene terpolymer (EPDM) was 382 Pa·s. Therefore, the ratio ($\eta_1/\eta_2$) of the apparent viscosity ($\eta_1$) of the ethylene-propylene-diene terpolymer to the apparent viscosity ($\eta_2$) of the ethylene-(meth)acrylate copolymer was 1.2.

(Flexibility)

The conductor was extracted from the sheath cable after the cross-linking treatment to obtain a sheath layer. Regarding the resin composition which forms a sheath layer, flexibility was evaluated by measuring tensile stress at 19% strain in accordance with JIS K7161-1. The test sample was prepared by forming the resin composition on a 1 mm thick resin sheet and then punching into a dumbbell shape No. 3 defined in JIS K6251: 2010 (Rubber, vulcanized or thermoplastic-Determination of tensile stress-strain properties). The tensile stress was measured at a test speed of 200 mm/min at room temperature (23° C.). A case where the tensile stress at 19% strain was 2.0 MPa or less was evaluated as "pass", and a case where it exceeded 2.0 MPa was evaluated as "fail".

(Abrasion Resistance)

The abrasion resistance was evaluated by a sandpaper abrasion test described in ISO6722-1 (4th edition) 5.12.4.1. First, an alumina sandpaper (manufactured by Riken Corundum Co., Ltd.) having a particle size of 150 was prepared, and conductive bands of 5 mm to 10 mm were attached to the sandpaper so that the interval was 75 mm or less. Next, the sheath cable after the cross-linking treatment was fixed on an unused portion of the sandpaper, and a weight of 1500 g was added to the sheath cable. In this state, the sandpaper was moved at a speed of (1500±75) mm/min, and the movement distance of the sandpaper until the sheath cable was worn and the metal conductor contacted the sandpaper was measured. A total of four points were measured by shifting one sheath cable by 90 degrees, and the average value was obtained. A case where the movement distance of the sandpaper was 330 mm or more was evaluated as "pass", and a case where it was less than 330 mm was evaluated as "fail".

(Observation by Transmission Electron Microscope)

The cross section of the sheath layer after the cross-linking treatment was observed by a transmission electron microscope as follows. First, the sheath layer was cut out and embedded in a resin. Next, a slice was cut out parallel to the outer surface of the sheath layer by an ultramicrotome (LEICA EM UCT manufactured by Leica) equipped with a diamond knife (ULTRA manufactured by DiATOME). The slice was vapor-deposited with a metal oxide, and the surface of the slice was observed by a transmission electron microscope (HT7700, manufactured by Hitachi High-Technologies Corporation.) at an acceleration voltage of 100 kV. The surface of the slice is a plane parallel to the outer surface of the sheath layer.

(Area Distribution of Dispersed Phase)

An area distribution of a dispersed phase dispersed in a continuous phase was analyzed by image processing. First, the dispersed phase was extracted manually from a transmission electron micrograph obtained as described above. Next, a minimum value, a maximum value, an average value, and standard deviation of the area ($\mu m^2$) of the dispersed phase were measured using image analysis/measurement software (Win ROOF manufactured by Mitani Corporation). Note that, the area of 0.05 $\mu m^2$ or less of the dispersed phase was excluded from the measurement target.

(Tensile Stress at Break)

A tensile stress at break was measured in accordance with JiS K7161-1: 2014. Specifically, the tensile stress at break was measured under the following conditions.

Test piece: A resin composition was formed on a 1 mm thick resin sheet, and then punched into a dumbbell shape No. 3 defined in JIS K6251: 2010.

Test temperature: Room temperature (23° C.)
Test speed: 200 mm/min (Tensile Strain at Break)

A tensile strain at break was measured in accordance with JIS K7161-1: 2014. Specifically, the tensile strain at break was measured under the following conditions.

Test piece: A resin composition was formed on a 1 mm thick resin sheet, and then punched into a dumbbell shape No. 3 defined in JIS K6251: 2010.

Test temperature: Room temperature (23° C.)
Test speed: 200 mm/min these sheath layers, the sea-island structure 1 is formed by the continuous phase 2 and the dispersed phase 3. From these facts, it has found that the abrasion resistance of the resin composition is improved by setting the α value to 1 or more and forming a sea-island structure. Note that, the area distribution of the dispersed phase 3 included in Example 1 and Example 2 was as indicated in Table 2.

TABLE 2

|  | Example 1 | Example 2 |
| --- | --- | --- |
| Minimum value | 0.07 | 0.05 |
| Maximum value | 3.61 | 4.89 |
| Average value | 0.6 | 0.71 |
| Standard deviation | 0.56 | 0.84 |

FIG. 9 is a graph illustrating stress-strain curves of various materials. As illustrated in FIG. 9, regarding the resin composition according to Example 4, the tensile stress at 19% strain is reduced, and it can be brought close to the tensile stress at 19% strain of silicone as compared with the case of the ethylene-ethyl acrylate copolymer (EEA) alone. Further, in the resin composition according to Example 4, the tensile stress at break is not so much lowered and the tensile strain at break is increased as compared with the case of the ethylene-ethyl acrylate copolymer (EEA) alone. Therefore, the resin composition according to Example 4 has a larger product of the tensile stress at break and the tensile strain at break as compared with the case of the ethylene-ethyl acrylate copolymer (EEA) alone. This suggests that the product of the tensile stress at break and the tensile strain at break has a correlation with the abrasion resistance.

|  | Example 1 | Example 2 | Example 3 | Example 4 | Comparative Example 1 | Comparative Example 2 | Comparative Example 3 |
| --- | --- | --- | --- | --- | --- | --- | --- |
| EEA | 80 | 70 | 60 | 50 | 90 | 40 | 30 |
| EPDM | 20 | 30 | 40 | 50 | 10 | 60 | 70 |
| Flame retardant | 40 | 40 | 40 | 40 | 40 | 40 | 40 |
| Antioxidant | 4 | 4 | 4 | 4 | 4 | 4 | 4 |
| Processing aid | 1 | 1 | 1 | 1 | 1 | 1 | 1 |
| Total | 145 | 145 | 145 | 145 | 145 | 145 | 145 |
| α value | 4.8 | 2.8 | 1.8 | 1.2 | 11 | 0.80 | 0.51 |
| Flexibility | 1.64 | 1.36 | 1.18 | 1.07 | 2.08 | 0.78 | 0.64 |
| Abrasion resistance | 800 | 700 | 620 | 530 | 900 | 200 | 150 |

As indicated in Table 0.1, the resin compositions according to Examples 1 to 4 were excellent in the flexibility and the abrasion resistance. In particular, it has been found that as the α value becomes smaller, the flexibility is improved. Moreover, it has been found that the abrasion resistance is improved, so that the value of (alpha) becomes large. On the other hand, the resin composition of Comparative Example 1 was excellent in the abrasion resistance but not in flexibility. Although the resin compositions of Comparative Examples 2 and 3 were excellent in the flexibility, they were not excellent in the abrasion resistance.

Figure 3:
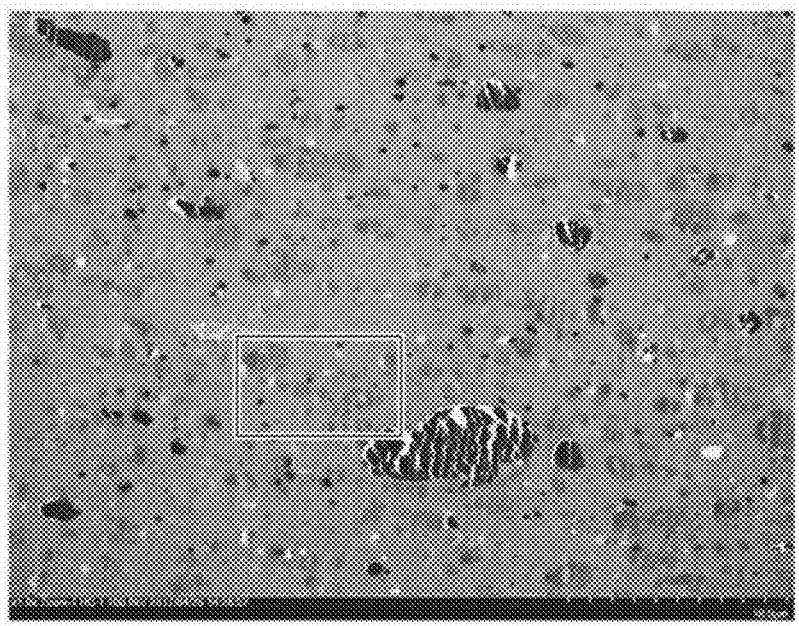
FIG. 3 is a photograph of a cross-section of the sheath layer according to Example 1 observed by a transmission electron microscope at a magnification of 6,000 times.
Figure 4:
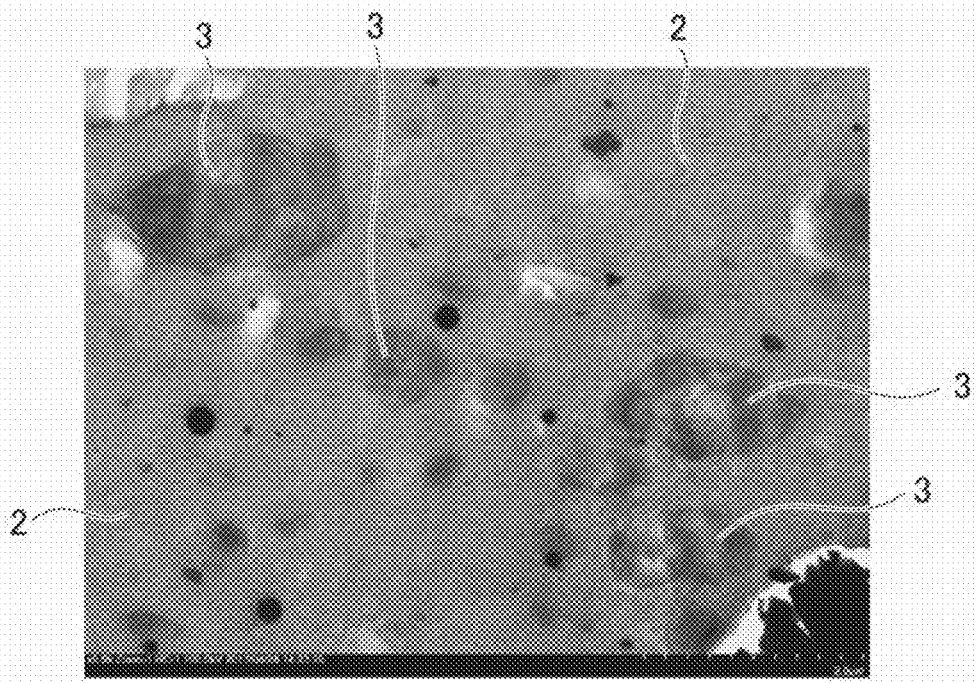
FIG. 4 is a photograph of a region enclosed by a frame in FIG. 3 at a magnification of 30,000 times.
Figure 5:
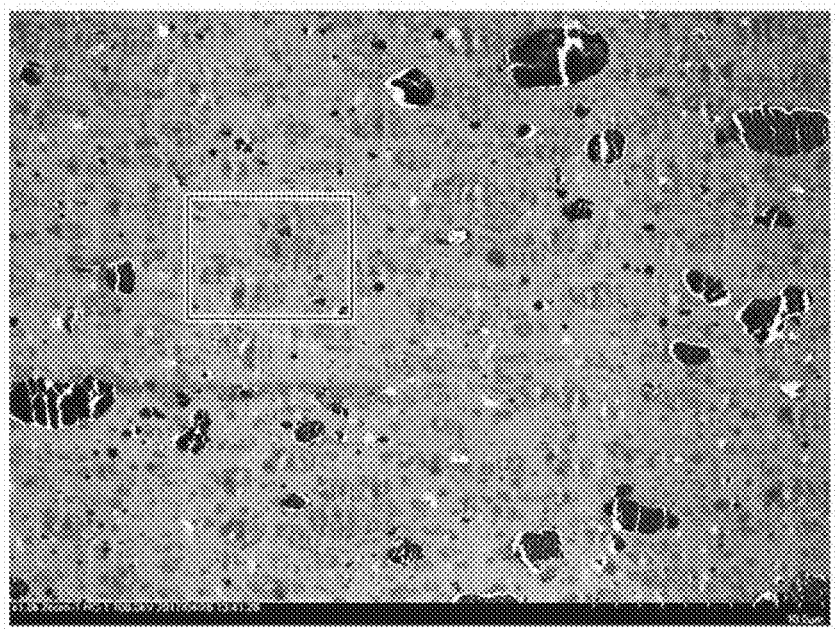
FIG. 5 is a photograph of a cross-section of the sheath layer according to Example 2 observed by a transmission electron microscope at a magnification of 6,000 times.
Figure 6:
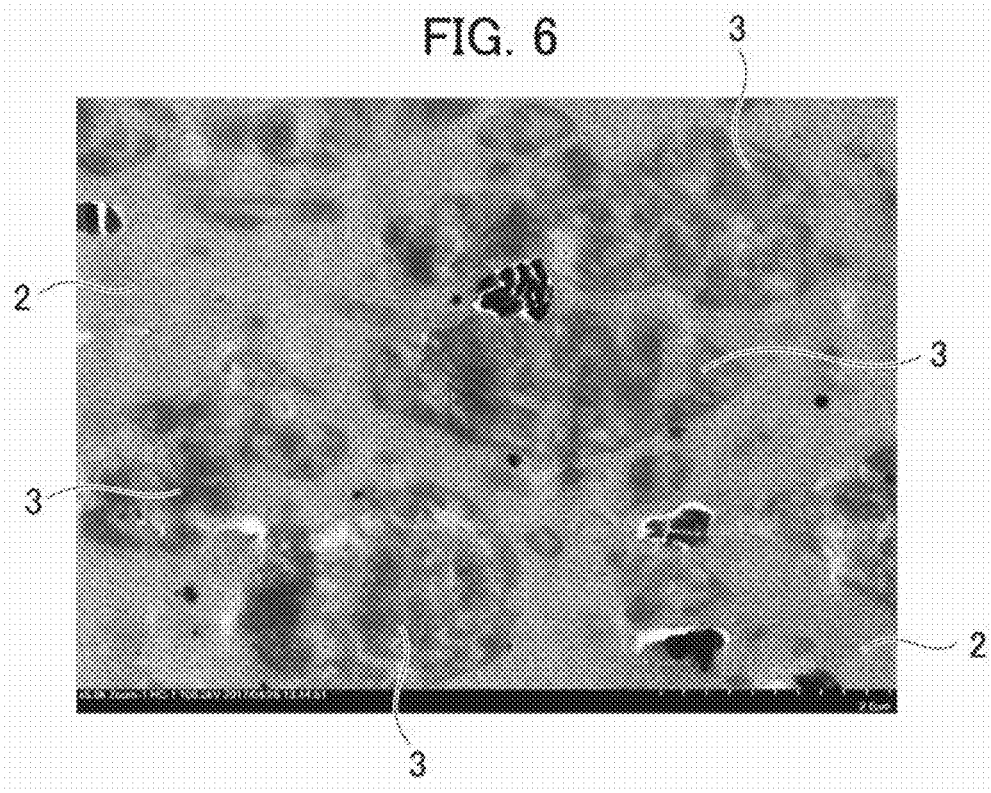
FIG. 6 is a photograph of a region enclosed by a frame in FIG. 5 at a magnification of 30,000 times.
Figure 7:
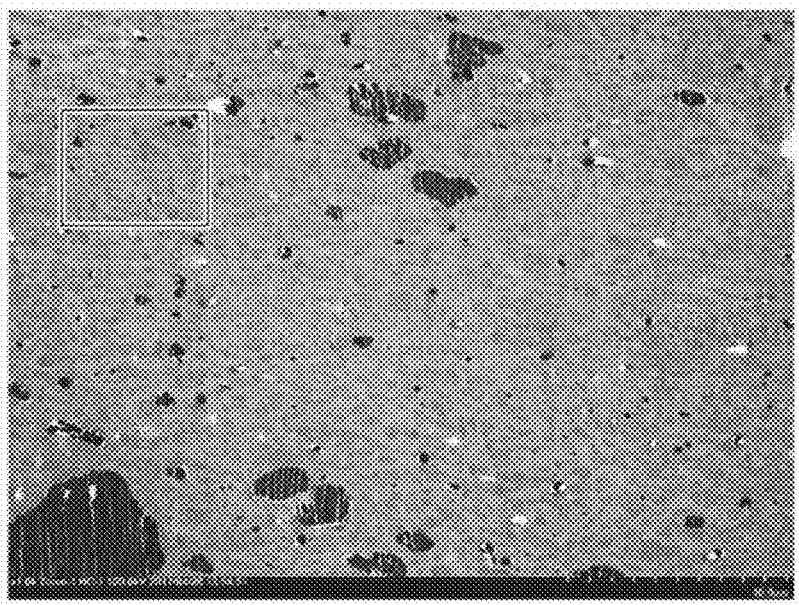
FIG. 7 is a photograph of a cross-section of the sheath layer according to Example 4 observed by a transmission electron microscope at a magnification of 6,000 times.
Figure 8:
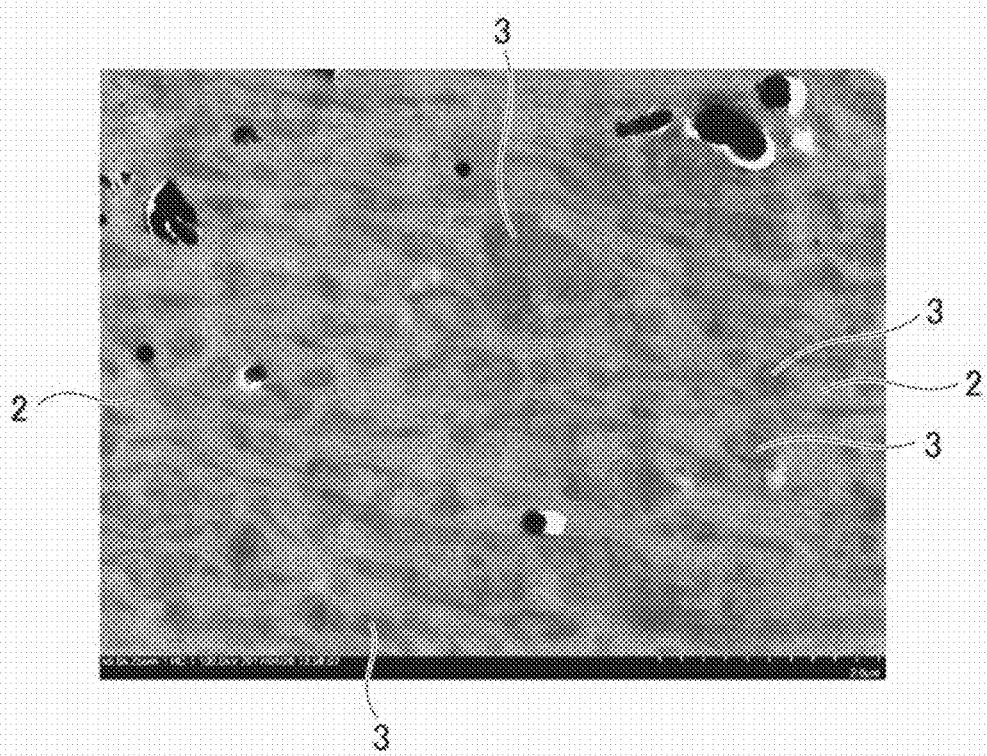
FIG. 8 is a photograph of a region enclosed by a frame in FIG. 6 at a magnification of 30,000 times.

FIGS. 3 and 4 are photographs taken by enlarging the cross section of the sheath layer of Example 1 at 6,000 times and 30,000 times. FIGS. 5 and 6 are photographs taken by enlarging the cross section of the sheath layer of Example 2 at 6000 times and 30000 times. FIGS. 7 and 8 are photographs taken by enlarging the cross section of the sheath layer of Example 4 at 6000 times and 30000 times. As illustrated in FIGS. 3 to 8, in the resin composition forming As illustrated in FIG. 9, regarding the resin composition according to Example 4, an unexpected effect of increasing tensile strain at break was observed as compared with the case of the ethylene-ethyl acrylate copolymer (EEA) alone and ethylene-propylene-diene terpolymer (EPDM) alone. This also increases the value of the product of the tensile stress at break and the tensile strain at break, which may contribute to the improved abrasion resistance.

As mentioned above, although the present embodiment has been described with reference to examples, the present embodiment is not limited to these, and various modifications are possible within the range of the gist of the present embodiment.

What is claimed is:
1. A resin composition comprising:
a resin component containing a copolymer of olefin and a comonomer having polarity and an ethylene-propylene-diene terpolymer, wherein the resin component is cross-linked,
tensile stress at 19% strain is 2.0 MPa or less, and
the resin composition has a sea-island structure in which the copolymer of olefin and the comonomer having polarity is a continuous phase, and the ethylene-propylene-diene terpolymer is a dispersed phase.

2. The resin composition according to claim 1, wherein a ratio of a volume of the copolymer of olefin and the comonomer having polarity to a volume of the ethylene-propylene-diene terpolymer is 0.5 or more.

3. The resin composition according to claim 1, wherein a product of a tensile stress at break and a tensile strain at break is 50 MPa or more.

4. A sheath cable comprising:
a conductor; and
a sheath layer that is configured to sheathe the conductor, and includes the resin composition according to claim 1 in which a distance of movement of sandpaper by a sandpaper abrasion test defined in ISO6722-1 5.12.4.1 is 330 mm or more.

5. A wire harness comprising the sheath cable according to claim 4.

* * * * *